United States Patent
Sorg et al.

(10) Patent No.: US 9,815,727 B2
(45) Date of Patent: Nov. 14, 2017

(54) REGENERATOR FOR GLASS MELTING TANKS

(71) Applicant: Beteiligungen Sorg GmbH & Co. KG, Lohr am Main (DE)

(72) Inventors: Alexander Sorg, Aschaffenburg (DE); Matthias Lindig, Ingelheim (DE); Thomas Breitfelder, Lohr am Main (DE)

(73) Assignee: Beteiligungen Sorg GmbH & Co. KG, Lohr am Main (DE)

( * ) Notice: Subject to any disclaimer, the term of this patent is extended or adjusted under 35 U.S.C. 154(b) by 250 days.

(21) Appl. No.: 14/605,149

(22) Filed: Jan. 26, 2015

(65) Prior Publication Data
US 2015/0210581 A1    Jul. 30, 2015

(30) Foreign Application Priority Data
Jan. 27, 2014  (DE) .................. 10 2014 000 849

(51) Int. Cl.
*C03B 5/237* (2006.01)
*F23L 15/02* (2006.01)
(Continued)

(52) U.S. Cl.
CPC ............ *C03B 5/237* (2013.01); *C03B 5/2375* (2013.01); *F23L 15/02* (2013.01); *F28D 17/02* (2013.01);
(Continued)

(58) Field of Classification Search
CPC .............................. C03B 5/237; C03B 5/2375
See application file for complete search history.

(56) References Cited

U.S. PATENT DOCUMENTS 1,058,647 A * 4/1913 Verzier .................. C03B 5/237
                                                          432/180
2,068,924 A    1/1937 Mulholland
(Continued)

FOREIGN PATENT DOCUMENTS

| BE | 447935  | 12/1942 |
| FR | 1202858 | 1/1960  |
| GB | 707607  | 4/1954  |

OTHER PUBLICATIONS

European Search Report, dated Jun. 15, 2015.
(Continued)

*Primary Examiner* — Nathaniel Herzfeld
(74) *Attorney, Agent, or Firm* — Greer, Burns & Crain Ltd.

(57) ABSTRACT

A regenerator for glass melting tanks for storing waste heat from combustion cycles and emitting the stored heat to oxidation gases supplied from the outside, having a gas-permeable chamber lattice in which the chamber lining is made of fire-resistant stones held together by lateral wall elements. A cover region is situated over the chamber lattice for the combustion gases entering into the chamber lattice and for the oxidation gases exiting from the chamber lattice, the chamber cover forming a flow duct together with a further cover segment, connected to the cover, limited by a downward-extending terminating wall that is connected to the burner throat and with the wall element. A segment of the lateral wall element between the flow duct running essentially vertically and the upper region of the chamber lattice is fashioned as an intermediate wall having a cooling duct system situated therein.

9 Claims, 4 Drawing Sheets

(51) Int. Cl.
  *F28D 17/02* (2006.01)
  *F28D 21/00* (2006.01)
(52) U.S. Cl.
  CPC ..... *F28D 2021/0078* (2013.01); *Y02E 20/348* (2013.01); *Y02P 40/535* (2015.11)

(56) References Cited

U.S. PATENT DOCUMENTS

| | | | | |
|---|---|---|---|---|
| 2,191,354 A | * | 2/1940 | Rateau | F27B 3/22 432/22 |
| 2,597,585 A | * | 5/1952 | Howard | C03B 3/02 432/13 |
| 2,679,389 A | * | 5/1954 | Luellen | F27B 3/002 432/181 |
| 2,860,449 A | * | 11/1958 | Paxton | C03B 5/04 65/134.6 |
| 3,009,690 A | * | 11/1961 | Brichard | C21C 5/04 432/180 |
| 3,437,327 A | * | 4/1969 | Day | C03B 5/44 432/161 |
| 4,047,560 A | * | 9/1977 | Tsai | C03B 5/237 165/9.3 |
| 4,744,809 A | * | 5/1988 | Pecoraro | C03B 5/1875 65/135.1 |
| 4,807,695 A | * | 2/1989 | Ward | C03B 5/237 165/10 |
| 2013/0086950 A1 | * | 4/2013 | Huber | C03B 5/167 65/134.5 |

OTHER PUBLICATIONS

Book: Glasschmelzöfen Konstruktion und Betriebsverhalten [Design and operating behavior of glass melting ovens], 1984, Springer-Verlag, pp. 35-46, Wolfgang Trier.

* cited by examiner

REGENERATOR FOR GLASS MELTING TANKS

CROSS-REFERENCES TO RELATED APPLICATIONS

This application claims the benefit of the German patent application No. 10 2014 000 849.5 filed on Jan. 27, 2014, the entire disclosures of which are incorporated herein by way of reference.

BACKGROUND OF THE INVENTION

The present invention relates to a regenerator for glass melting tanks, for storing waste heat from combustion cycles and for emitting the stored heat to oxidation gases supplied from the outside, having a gas-permeable chamber lattice made up of regenerative chambers having a chamber lining made of fire-resistant stones held together by lateral wall elements, having an upper limiting surface and a lower limiting surface that are situated at a distance from a chamber cover and a chamber floor, a cover region being situated over the chamber lattice for the combustion gases entering into the chamber lattice and for the oxidation gases exiting from the chamber lattice, the cover region being connected to the glass melting tank via a burner port, the vertical cross-section of the burner port being situated at least partly underneath the upper limiting surface of the chamber lattice, opening into the cover region, and a further cover segment being connected to the chamber cover, which further segment upwardly terminates the cover region and is limited by a downward-extending terminating wall that is connected to the burner throat and that forms a flow duct together with the wall element.

In the book by Wolfgang Trier, Glasschmelzöfen Konstruktion and Betriebsverhalten [Design and operating behavior of glass melting ovens], 1984, Springer-Verlag, pp. 35-46, it is described how, in the melting of glass for heat recuperation by means of heat regenerators, also referred to as regenerators or regenerative chambers, the waste heat can be made useful for pre-heating the combustion air. Gas-permeable lattice structures are situated in a vertical shaft or housing in the regenerative chambers, through which lattices exhaust gases or combustion gases from glass melting ovens flow in alternating fashion, and which emit a part of the stored heat to the oxidation gas after the periodic reversal of the flow direction, whereby the thermal efficiency of the entire installation can be significantly increased. Here, the laterally situated burner port of the melting tank is situated above the upper limiting surface of the lattice structure. Depending on the power rating of the melting oven, this results in significant constructive heights of the regenerators.

The dimensioning of the lattice structures is essentially determined by the overall power level of the glass melting tanks. As the constructive height of the regenerator, and the defined position of the glass melting tanks, increases, this requires either a deeper foundation or an increased surface requirement. Both of these entail significant disadvantages.

Therefore, U.S. Pat. No. 2,068,924 has already proposed to situate the burner port in a regenerator in such a way that it opens into the cover space underneath the chamber lattice. However, this means that a separating wall is required between the upper chamber lattice and the burner port, which wall is strongly thermally loaded from both sides and is constantly exposed to the corrosive exhaust gas of the melting tank. This holds in particular for the region of the upper layers of the fire-resistant stones of the regenerative chambers, which, when the firing is changed, are exposed to a significant thermal shock.

SUMMARY OF THE INVENTION

An object of the present invention is therefore to increase the stability of the wall element used as a separating wall in a regenerator for glass melting tanks of the type described above.

According to the present invention, this object is achieved in that the segment of the lateral wall element between the flow duct, running essentially vertically, and the upper region of the chamber lattice is fashioned as an intermediate wall having a cooling duct system situated therein. It has turned out to be advantageous that the flow duct forms, together with the flow path inside the chamber lattice, a U-shaped flow path.

According to a preferred embodiment of the present invention, the intermediate wall extends from the floor of the burner port to the upper edge of the wall element. In this region, the wall element is immediately exposed to the combustion gases of the glass melting oven.

In order to enable a simple cooling duct system, according to the present invention it is provided that cooling pipes are situated in the intermediate wall. These pipes usefully run horizontally through the entire intermediate wall.

In a development of this idea of the present invention, it is provided that air, or a liquid or gaseous cooling medium, flows through the cooling pipes.

According to a further specific embodiment of the present invention, for the cooling of the intermediate wall, in this wall there are fashioned hollow spaces configured horizontally one over the other, having openings at both sides for the introduction and discharge of a cooling medium.

The inventive features of the present invention can advantageously be used both in glass melting ovens having a glass melting tank fashioned as an end-fired furnace, having two regenerative chambers situated alongside one another with cooled intermediate walls, or in glass melting ovens having a glass melting tank fashioned as a cross-fired furnace, having oppositely situated regenerative chambers with cooled intermediate walls.

BRIEF DESCRIPTION OF THE DRAWINGS

In the following, the present invention is explained in more detail with reference to two exemplary embodiments shown in the drawing.

DETAILED DESCRIPTION OF THE PREFERRED EMBODIMENTS

Figure 1:
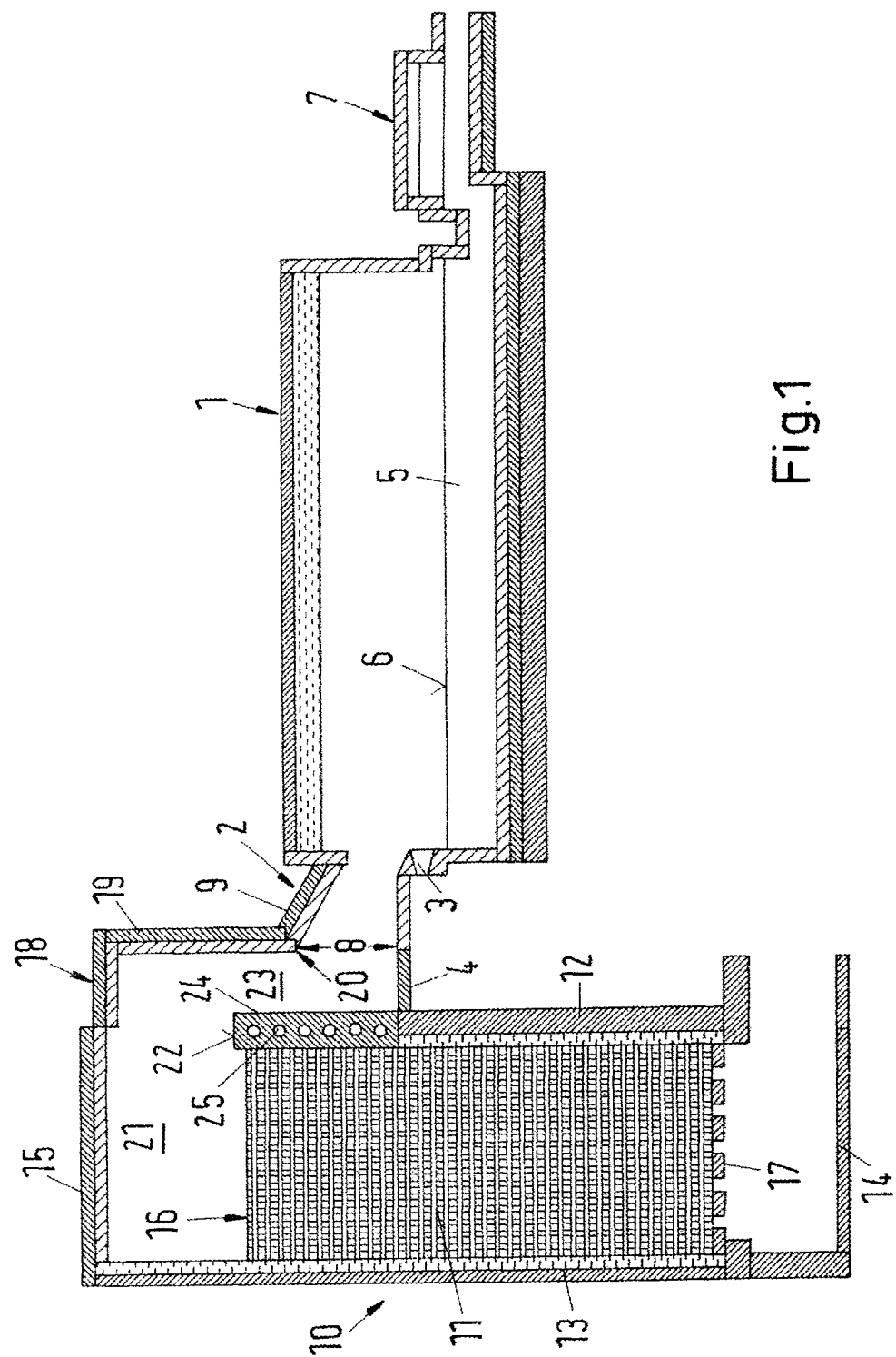
FIG. 1 shows, in a vertical section, the design of a glass melting tank constructed as an end-fired furnace, with a regenerator.

A glass melting tank 1 shown in FIG. 1 (referred to hereinafter as "melting tank") is shown in a plane that agrees with the plane of symmetry of one of the two burner ports 2. For simplicity, the burners in burner ports 2 are not shown. So-called "underport" burners can also be used, of which a mouth 3 below a floor 4 of burner port 2 is indicated. In melting tank 1, there is a glass melt 5 having a melt bath level 6 and a main direction of flow to a discharge device 7, to which a consumer (not shown) is connected.

The burner port 2 has a vertical inner cross-section 8. It is connected to a regenerator 10 via a burner throat 9 of the burner port 2. In this regenerator, there are situated chamber lattice structures 11 made up of fire-resistant stones. These are surrounded by wall elements 12 and 13, and are held together by these. The regenerator 10 has a chamber floor 14 and a chamber cover 15, each at a distance from the chamber lattice structure 11. The chamber lattice structure 11 has an upper limiting surface 16 and a lower limiting surface 17. To the chamber cover 15 there is connected a further cover segment 18 that is limited by a downward-extending terminating wall 19 that is connected to the burner throat 9.

In the depicted exemplary embodiment, a lower edge 20 of the terminating wall 19 is situated below the upper limiting surface 16 of the chamber lattice structure 11. The wall element 12 is correspondingly shortened in its height.

The upper region of the wall element 13 forms, together with the chamber cover 15, the further cover segment 18, and the terminating wall 19 above the chamber lattice structure 11, a covering region 21, also referred to as headroom. With this configuration, at both sides of the wall element 12 and its upper edge 22 in the covering region 21 there is formed a downward-directed U-shaped flow duct 23.

Alongside the regenerator 10 there is situated (covered in the depiction shown in FIG. 1), in mirror-symmetrical configuration to the center longitudinal plane of the melting tank 1, a second regenerator having a second burner port. Both are operated with a periodic cycle of reversal. While the one regenerator 10 is charged from below with fresh oxidation gas, which is subsequently mixed with fossil fuels and combusted, in the other regenerator 10 the direction of flow is reversed after the burners are switched off, and the chamber lattice structure 11 is again heated. The cycle time is standardly about 15 to 25 minutes.

Figure 2:
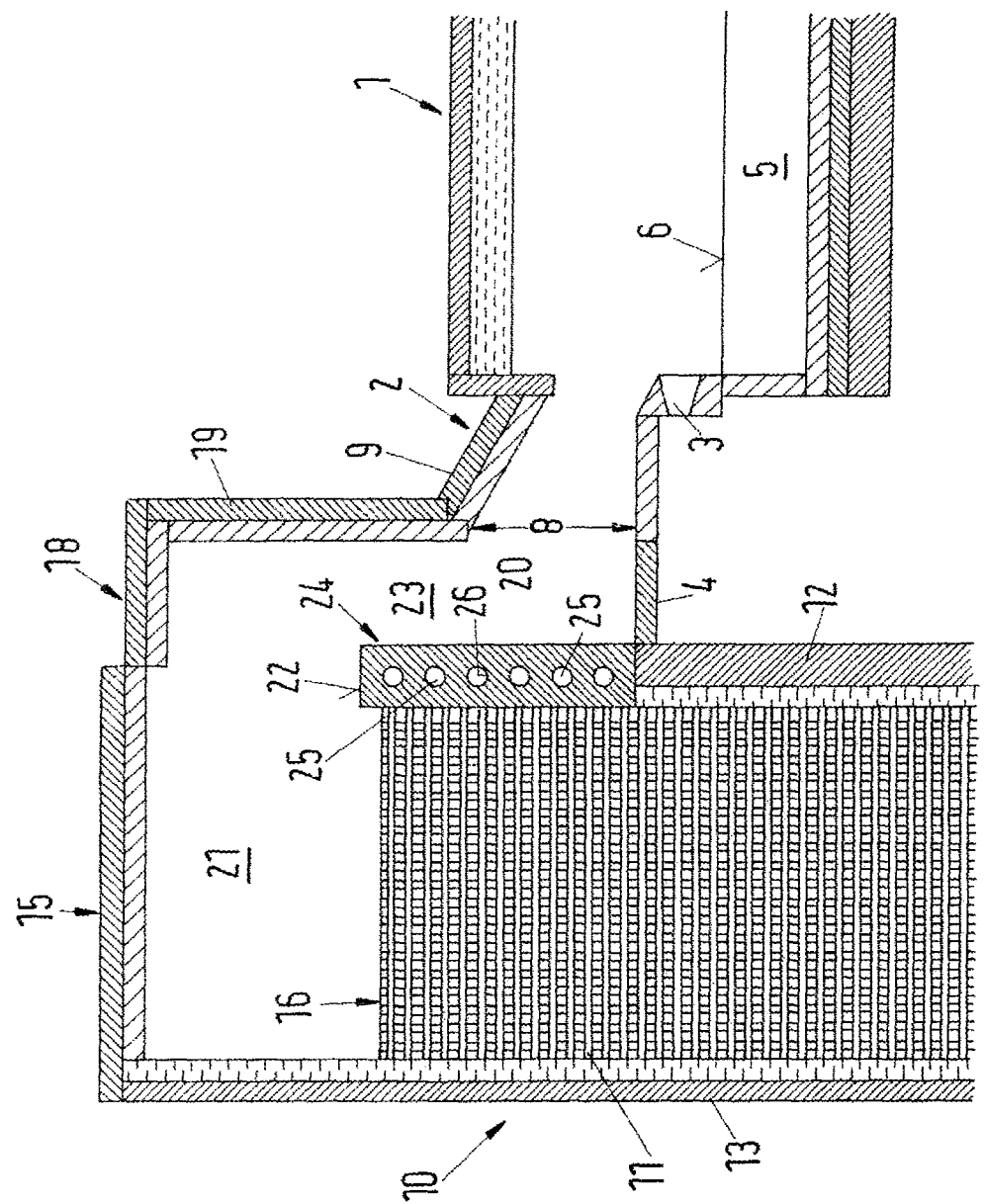
FIG. 2 shows an enlarged detail from the vertical section of FIG. 1, illustrating the cooling duct system in the intermediate wall of the regenerator.
Figure 3:
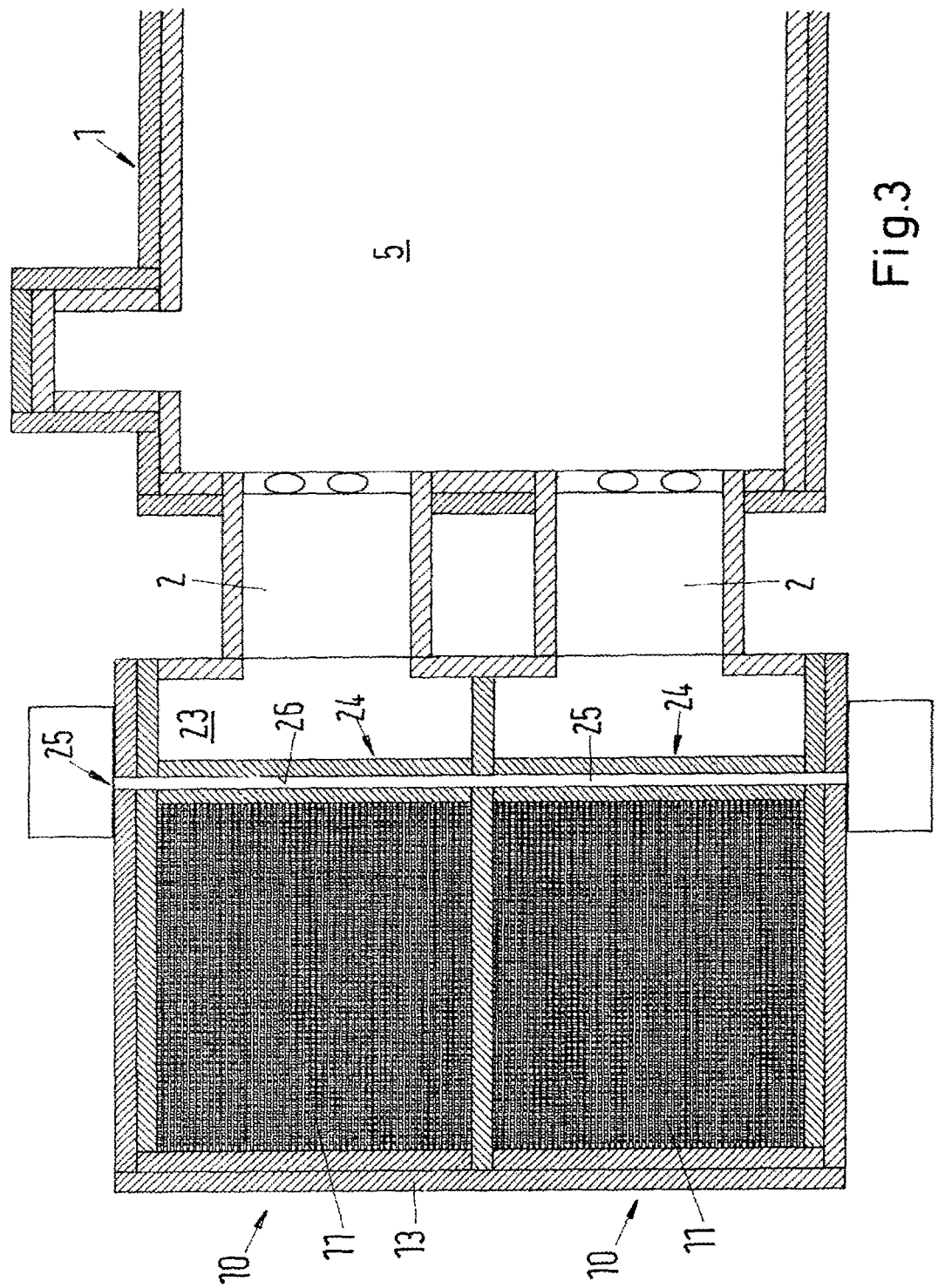
FIG. 3 shows a top view of the regenerator shown in FIG. 2.

When there is such a firing change, the part of wall element 12 situated above the floor 4 of the burner port 2 is strongly thermally loaded from both sides, and is continuously exposed to the corrosive exhaust gas of the melting tank. This poses a serious danger to the stability of the overall construction. Therefore, this part of the wall element 12 is fashioned as an intermediate wall 24 having a cooling duct system 25. The cooling duct system 25 is made up of cooling pipes 26 through which air, or some other liquid or gaseous cooling medium, is conducted. As FIG. 2 shows, a plurality of the cooling pipes 26 are situated one over the other in intermediate wall 24. These pass completely through the intermediate wall 24 (see FIG. 3).

Instead of the cooling pipes 26, for the cooling of the intermediate wall 24 hollow spaces (not shown) situated horizontally one over the other can be fashioned in this wall, fashioned so as to be laterally accessible for the introduction and discharge of a cooling medium.

Figure 4:
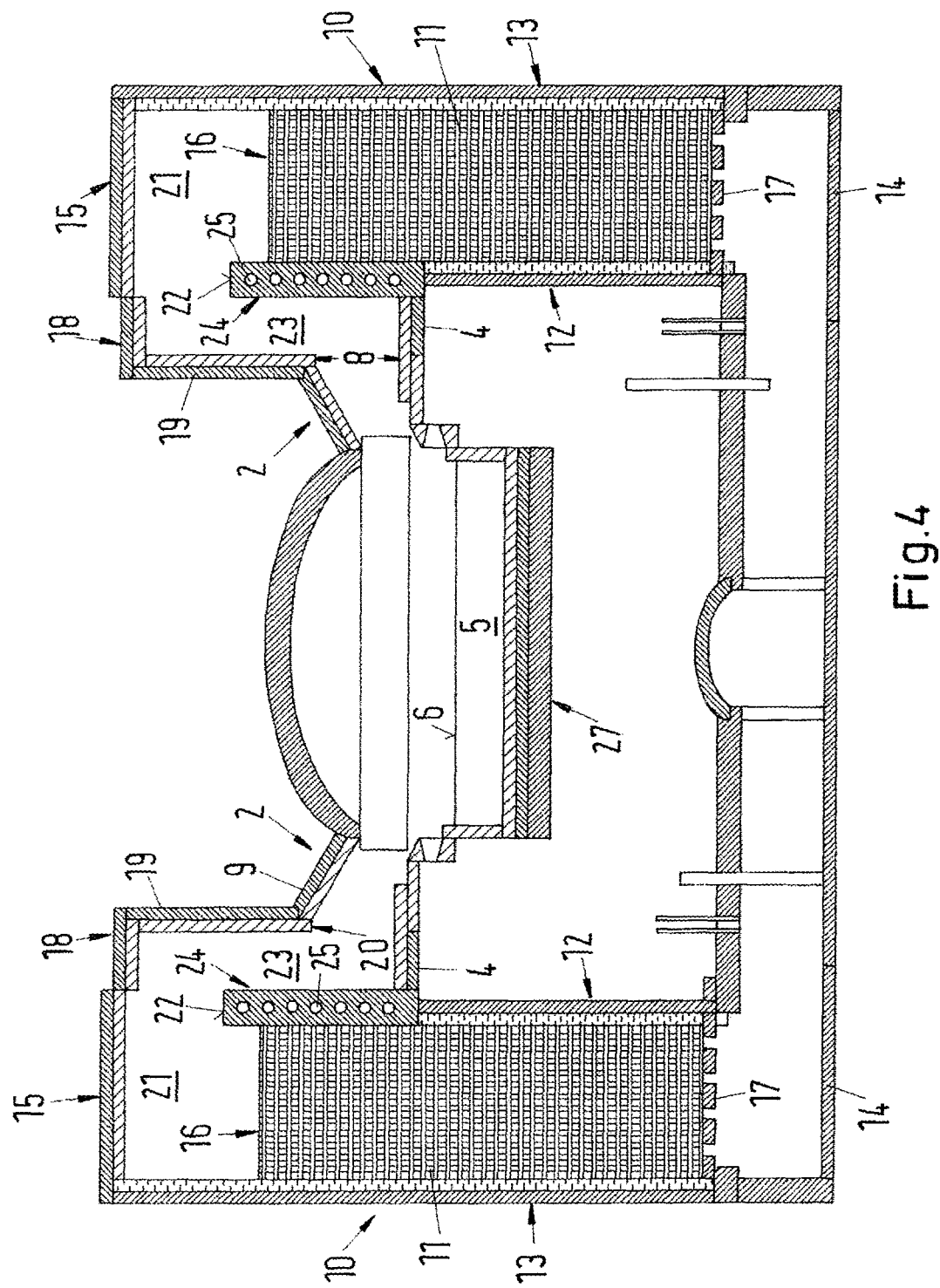
FIG. 4 shows, in a vertical section corresponding to FIG. 1, the design of a glass melting tank having two regenerators, fashioned as a cross-fired furnace.

The regenerators 10 having cooled intermediate walls 24 can in the same way be used both in connection with end-fired furnaces 1 according to FIG. 1 and with cross-fired furnaces 27 according to FIG. 4. The parts thereof are to a large extent identical, so that in FIG. 4 identical parts have been provided with identical reference characters. The direction of view into the melting tank 27 is in the direction of its longitudinal axis and of the direction of flow of the glass to the discharge device, which is not shown. In the specific embodiment according to FIG. 4 as well, the regenerators 10, situated opposite one another in mirror-symmetrical fashion, are operated in alternating fashion for heat recuperation.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

LIST OF REFERENCE CHARACTERS 1 glass melting tank (end-fired furnace)
2 burner port
3 mouth
4 floor
5 glass melt
6 melt level
7 discharge device
8 cross-section
9 burner throat
10 regenerator (regenerative chamber)
11 chamber lattice structure
12 wall element
13 wall element
14 chamber floor
15 chamber cover
16 upper limiting surface
17 lower limiting surface
18 cover segment
19 terminating wall
20 lower edge
21 cover region (headroom)
22 upper edge
23 flow duct
24 intermediate wall
25 cooling duct system
26 cooling pipes
27 glass melting tank (cross-fired furnace)

The invention claimed is:

1. A regenerator for glass melting tanks, for storing waste heat from combustion cycles and for emitting the stored heat to oxidation gases supplied from the outside, comprising:
   a gas-permeable chamber lattice made up of regenerative chambers having a chamber lining made of fire-resistant stones held together by a first and additional lateral wall elements, having
      an upper limiting surface and a lower limiting surface that are situated at a distance from a chamber cover and a chamber floor,
   a cover region being fashioned over the chamber lattice for the combustion gases entering into the chamber lattice and for the oxidation gases exiting from the chamber lattice,
      the cover region being connected to the glass melting tank via a burner port,
   a vertical cross-section of the burner port being situated at least partly lower than the upper limiting surface of the chamber lattice, opening into the cover region, and
   a further cover segment being connected to the chamber cover, which further segment upwardly terminates the cover region and is limited by a downward-extending terminating wall that is connected to a burner throat and that forms a flow duct together with the first lateral wall element, wherein a segment of the first lateral wall element between a portion of the flow duct running essentially vertically and an upper region of the chamber lattice is fashioned as an intermediate wall having a cooling duct system situated therein with ducts of the cooling duct system enclosed by the intermediate wall.

2. The regenerator as recited in claim 1, wherein the flow duct forms a U-shaped flow path together with a flow path inside the chamber lattice.

3. The regenerator as recited in claim 1, wherein the intermediate wall extends from a floor of the burner port to an upper edge of the first lateral wall element.

4. The regenerator as recited in claim 1, wherein cooling pipes are situated in the intermediate wall.

5. The regenerator as recited in claim 4, wherein the cooling pipes run horizontally through the intermediate wall.

6. The regenerator as recited in claim 4, wherein at least one of air, or a liquid or gaseous cooling medium, flows through the cooling pipes.

7. The regenerator as recited in claim 1, wherein for cooling, in the intermediate wall there are fashioned hollow spaces configured horizontally one over the other, having openings at both sides for the introduction and for the discharge of a cooling medium.

8. A glass melting oven having a glass melting tank fashioned as an end-fired furnace having two regenerative chambers situated alongside one another, each regenerative chamber comprising:

a gas-permeable chamber lattice made up of regenerative chambers having a chamber lining made of fire-resistant stones held together by a first and additional lateral wall elements, having an upper limiting surface and a lower limiting surface that are situated at a distance from a chamber cover and a chamber floor, a cover region being fashioned over the chamber lattice for the combustion gases entering into the chamber lattice and for the oxidation gases exiting from the chamber lattice, the cover region being connected to the glass melting tank via a burner port, a vertical cross-section of the burner port being situated at least partly lower than the upper limiting surface of the chamber lattice, opening into the cover region, and a further cover segment being connected to the chamber cover, which further segment upwardly terminates the cover region and is limited by a downward-extending terminating wall that is connected to a burner throat and that forms a flow duct together with the first lateral wall element, wherein a segment of the first lateral wall element between a portion of the flow duct running essentially vertically and an upper region of the chamber lattice is fashioned as an intermediate wall having a cooling duct system situated therein with ducts of the cooling duct system enclosed by the intermediate wall.

9. A glass melting oven having a glass melting tank fashioned as a cross-fired furnace having regenerative chambers situated opposite one another, each regenerative chamber comprising:

a gas-permeable chamber lattice made up of regenerative chambers having a chamber lining made of fire-resistant stones held together by a first and additional lateral wall elements, having an upper limiting surface and a lower limiting surface that are situated at a distance from a chamber cover and a chamber floor, a cover region being fashioned over the chamber lattice for the combustion gases entering into the chamber lattice and for the oxidation gases exiting from the chamber lattice, the cover region being connected to the glass melting tank via a burner port, a vertical cross-section of the burner port being situated at least partly lower than the upper limiting surface of the chamber lattice, opening into the cover region, and a further cover segment being connected to the chamber cover, which further segment upwardly terminates the cover region and is limited by a downward-extending terminating wall that is connected to a burner throat and that forms a flow duct together with the first lateral wall element, wherein a segment of the first lateral wall element between a portion of the flow duct running essentially vertically and an upper region of the chamber lattice is fashioned as an intermediate wall having a cooling duct system situated therein with ducts of the cooling duct system enclosed by the intermediate wall.

* * * * *